United States Patent
Wang et al.

(10) Patent No.: US 10,979,615 B2
(45) Date of Patent: *Apr. 13, 2021

(54) SYSTEM AND METHOD FOR PROVIDING AUTONOMOUS PHOTOGRAPHY AND VIDEOGRAPHY

(71) Applicant: Hangzhou Zero Zero Technology Co., Ltd., Zhejiang (CN)

(72) Inventors: Mengqiu Wang, Zhejiang (CN); Lixin Liu, Zhejiang (CN); Tong Zhang, Zhejiang (CN); Jia Lu, Zhejiang (CN)

(73) Assignee: Hangzhou Zero Zero Technology Co., Ltd., HangZhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/448,535

(22) Filed: Jun. 21, 2019

(65) Prior Publication Data

US 2019/0335084 A1    Oct. 31, 2019

Related U.S. Application Data

(63) Continuation of application No. 15/637,954, filed on Jun. 29, 2017, now Pat. No. 10,375,289.

(Continued)

(51) Int. Cl.
*H04N 5/232* (2006.01)
*G01S 3/786* (2006.01)
(Continued)

(52) U.S. Cl.
CPC ....... *H04N 5/23203* (2013.01); *B64C 39/024* (2013.01); *B64D 47/08* (2013.01);
(Continued)

(58) Field of Classification Search
None
See application file for complete search history.

(56) References Cited

U.S. PATENT DOCUMENTS

| 2010/0265357 A1* | 10/2010 | Liu | H04N 5/235 |
| | | | 348/223.1 |
| 2012/0195573 A1* | 8/2012 | Flint | G11B 27/34 |
| | | | 386/278 |

(Continued)

FOREIGN PATENT DOCUMENTS

| CN | 104828256 A | 8/2015 |
| CN | 105939563 A | 9/2016 |

(Continued)

OTHER PUBLICATIONS

Face Recognition Using Eigenfaces; Matthew A. Turk, et al.; computer vision and pattern recognition, IEEE; 1991: 386-591; 6 pages.

(Continued)

*Primary Examiner* — Kate H Luo (57) ABSTRACT

An aerial system, including a processing system, an optical system, an actuation system and a lift mechanism, includes an autonomous photography and/or videography system 70, implemented, at least in part, by the processing system 22, the optical system 26, the actuation system 28 and the lift mechanism 32. The autonomous photograph and/or videography system performs the steps of establishing a desired flight trajectory, detecting a target, controlling the flight of the aerial system as a function of the desired flight trajectory relative to the target using the lift mechanism and controlling the camera to capture pictures and/or video.

30 Claims, 6 Drawing Sheets

Related U.S. Application Data (60) Provisional application No. 62/479,766, filed on Mar. 31, 2017.

(51) Int. Cl.

| | | |
|---|---|---|
| *H04N 7/18* | (2006.01) | |
| *G01S 17/89* | (2020.01) | |
| *G01S 17/86* | (2020.01) | |
| *B64C 39/02* | (2006.01) | |
| *B64D 47/08* | (2006.01) | |
| *G01S 17/02* | (2020.01) | |
| *G05D 1/00* | (2006.01) | |
| *G06K 9/00* | (2006.01) | |

(52) U.S. Cl.
CPC ............ *G01S 3/7864* (2013.01); *G01S 17/86* (2020.01); *G01S 17/89* (2013.01); *G05D 1/0011* (2013.01); *G05D 1/0088* (2013.01); *G05D 1/0094* (2013.01); *G06K 9/00255* (2013.01); *H04N 5/232* (2013.01); *H04N 5/23216* (2013.01); *H04N 7/185* (2013.01); *B64C 2201/127* (2013.01); *B64C 2201/141* (2013.01); *B64C 2201/146* (2013.01); *G01S 17/02* (2013.01); *G06K 9/0063* (2013.01); *G06K 9/00805* (2013.01); *G06K 2209/21* (2013.01)

(56) References Cited

U.S. PATENT DOCUMENTS

| | | | |
|---|---|---|---|
| 2012/0287274 A1 | 11/2012 | Bevirt | |
| 2013/0332866 A1* | 12/2013 | Johnson | G06T 5/40 715/764 |
| 2015/0109337 A1* | 4/2015 | Hofmann | G06T 19/006 345/633 |
| 2015/0350614 A1 | 12/2015 | Meier et al. | |
| 2016/0063642 A1* | 3/2016 | Luciani | G06Q 40/08 705/4 |
| 2016/0304198 A1* | 10/2016 | Jourdan | G05D 1/0088 |
| 2016/0378109 A1* | 12/2016 | Raffa | G05D 1/005 701/2 |
| 2017/0244937 A1* | 8/2017 | Meier | B64C 39/024 |
| 2017/0293297 A1* | 10/2017 | Kim | B64D 43/00 |
| 2017/0339337 A1* | 11/2017 | Kim | H04N 5/232 |
| 2018/0024557 A1* | 1/2018 | Leurent | G03B 15/006 701/2 |

FOREIGN PATENT DOCUMENTS

| | | |
|---|---|---|
| CN | 105979147 A | 9/2016 |
| CN | 107087427 A | 8/2017 |

OTHER PUBLICATIONS

Faster R-CNN: Towards Real-Time Object Detection with Region Proposal Networks[J]; Shaoquing Ren,et al.; IEEE Transactions on Pattern Analysis and Machine Intelligence, 2015: 1-1; 9 pages.

High-precision, consistent EKF-based visual-inertial odometry. Mingyang Li, et al.; The International Journal of Robotics Research 32(6) 690-711.; 33 pages.

High-Speed Tracking with Kernelized Correlation Filters[J].; Joao F. Henriques, et al.; IEEE Transactions on Pattern Analysis and Machine Intelligence, 2015, 37(3): 583-596; 14 pages.

Keyframe-based visual—inertial odometry using nonlinear optimization; Stefan Leutenegger; et al.; The International Journal of Robotics Research 2015: vol. 34(3) 314-334; 8 pages.

Nonlinear filters: beyond the Kalman filter, IEEE A&E; Fred Daum; IEEE Aerospace and Electronic Systems Magazine, vol. 20, Issue: 8, 2005: 57-69; 14 pages.

ORB-SLAM: A Versatile and Accurate Monocular SLAM System; Raul Mur-Artal; et al.; IEEE Transactions on Robotics, 2015, 31(5): 1147-1163; 18 pages.

SSD: Single Shot MultiBox Detector; Wei Liu, et al; european conference on computer vision, 2015: 21-37; 17 pages.

Struck: Structured Output Tracking with Kernels; Sam Hare, et al.; international conference on computer vision, 2011: 263-270; IEEE Transactions on Pattern Analysis and Machine Intelliegence, 2014; 14 pages.

SVO: Fast semi-direct monocular visual odometry; Christian Forster; et al.; international conference on robotics and automation, 2014: 15-22; 8 pages.

The Unscented Kalman Filter for Nonlinear Estimation; Eric A. Wan, et al.; IEEE 2000 DOI: 10.1109/ASSPCC.2000.882463; 6 pages.

Tracking-Learning-Detection; Zdenek Kalal, et al.; IEEE Transactions on Pattern Analysis and Machine Intelligence, vol. 6, No. 1, Jan. 2010; 14 pages.

You Only Look Once: Unified, Real-Time Object Detection; Joseph Redmon, et al.; computer vision and pattern recognition, 2015: 779-788.

International Search Report and Written Opinion (PCT/IB2017/057466); dated Feb. 24, 2018; 5 pages.

* cited by examiner

SYSTEM AND METHOD FOR PROVIDING AUTONOMOUS PHOTOGRAPHY AND VIDEOGRAPHY

CROSS-REFERENCE TO RELATED APPLICATION

This application is a continuation of U.S. patent application Ser. No. 15/637,954, filed Jun. 29, 2017, which claims the benefit of U.S. Provisional Patent Application Ser. No. 62/479,766, filed Mar. 31, 2017, the disclosures of which are hereby incorporated by reference in their entirety.

TECHNICAL FIELD

This invention relates generally to the aerial system field, and more specifically, to a system and method for providing automatic operation of an aerial system to follow an established trajectory and controllably provide photographic and videographic features.

BACKGROUND OF THE INVENTION

Currently, there are two general approaches in allowing a user to control a drone to take photos and videos. First, the drone may be controller using a remote controller (RC) or other mobile device, such as a mobile phone or tablet. In these types of systems, a user must control the drone manually through physical interaction with the RC or mobile device. This approach provides several shortcomings. First, it requires hours or days or even months of practice for a user to become proficient in controlling the drone. Additionally, not only does the user have to control operation, i.e., flight, of the drone, but the user must also control the camera to capture pictures and/or video. Thus, the quality of the image or video is limited by not only the skills of controlling the drone but also the controller's photography or videography experience.

The second approach is an auto-follow feature. Using the auto-follow feature, the drone or aerial system chooses and locks onto a person and automatically captures pictures and/or video. Generally, this is the person that is operating the RC or mobile device, i.e., the "owner", but may also be another person, such as a person wearing or being associated with a tracking device. This approach also has shortcomings. In general, the movement or drone instructions are relatively simple, i.e., follow the user while capturing pictures and/or video. Using this approach, the resulting pictures and/or video are limited, i.e., always the same or a single view. For example, this approach usually results in pictures and/or video that consists of all front-view, back-view or side-view pictures and/or video of the user. Furthermore, the distance between the drone and the target person is generally unchanged. That is, all of the pictures and/or video are either distant-shots, mid-shot or close-shot. Furthermore, the interaction is also not intuitive. The user needs to operate the drone on the smart phone and/or carry a device for tracking. Furthermore, the auto-follow feature is generally focused on, or locked onto, one person. This interaction is always locked to one person, and thus, does not work well for capturing images and/or video of groups of people, such as, dancers, people at a large gathering, team athletics, e.g., basketball.

The present invention is aimed at one or more of the problems identified above.

SUMMARY OF THE INVENTION

In one aspect of the present invention, an aerial system is provided. The aerial system includes a body, a lift mechanism coupled to the body, a camera and a processing system. The camera is controllably mounted to the body by an actuation system. The processing system is coupled to the lift mechanism, the camera, and the actuation system and is configured to establish a desired flight trajectory, to detect a target, and to control the flight of the aerial system as a function of the desired flight trajectory relative to the target using the lift mechanism. The processing system is further configured to control the camera to capture pictures and/or video.

In another aspect of the present invention, a method for operating an aerial system is provided. The aerial system includes a body, a lift mechanism, a camera, and a body by an actuation system. The method including the steps of establishing, by the processing system, a desired flight trajectory; detecting a target; and controlling, by the processing system, the flight of the aerial system as a function of the desired flight trajectory relative to the target using the lift mechanism. The method also includes the step of controlling, by the processing system, the camera to capture pictures and/or video.

DETAILED DESCRIPTION OF THE INVENTION

The following description of the embodiments of the invention is not intended to limit the invention to these embodiments, but rather to enable any person skilled in the art to make and use this invention. With reference to the drawings and in operation, system 10 for controlling an aerial system 12, for example a drone, is provided. The system 10 may include a remote device 14 with a control client 16. The control client 16 provides a user interface (see below) that allows a user 18 to send instructions to the aerial system 12 to control operation thereof. As discussed in more depth below, the aerial system 12 includes one or more cameras (see below) for obtaining pictures and/or video which may be sent to the remote device 14 and/or stored in memory on the aerial system 12.

The aerial system 12 may include one or more sensors (see below) for detecting or sensing operations or actions, i.e., expressions, performed by the user 18 to control operation of the aerial system 12 (see below) without direct or physical interaction with the remote device 14. In controller-free embodiments, the entire control loop from start (release and hover) to finish (grab and go), as well as controlling motion of the aerial system 12 and trigger of events, e.g., taking pictures and video, are performed solely on board the aerial system 12 without involvement of the remote device 14. In some such embodiments or systems 10, a remote device 14 may not be provided or included.

In some embodiments, the remote device 14 includes one or more sensors that detect or sense operation or actions performed by the user 18 to control operation of the aerial system 12 without physical interaction with the remote device 14 under certain conditions, for example, when the aerial system 12 is too far from the user 18.

In one aspect of the present invention, the aerial system 12 includes a processing system that is configured to establish a desired flight trajectory, to detect a target, and to control the flight of the aerial system as a function of the desired flight trajectory relative to the target using the lift mechanism. The processing system is further configured to control the camera to capture pictures and/or video.

Overview of the System 10 and the Aerial System 12

An exemplary aerial system 12 and control system 10 is shown in FIGS. 1-5. The control client 16 of the aerial system 12 functions to receive data from the aerial system 12, including video images and/or video, and control visual display on the remote device 14. The control client 16 may also receive operation instructions and facilitate aerial system 12 remote control based on operation instructions. The control client 16 is preferably configured to execute on a remote device 14, but can alternatively be configured to execute on the aerial system 12 or on any other suitable system. As discussed above, and more fully below, the aerial system 12 may be controlled solely without direct or physical interaction with the remote device 14.

The control client 16 can be a native application (e.g., a mobile application), a browser application, an operating system application, or be any other suitable construct.

The remote device 14 executing the control client 16 functions to display the data (e.g., as instructed by the control client 16), receive user inputs, compute the operation instructions based on the user inputs (e.g., as instructed by the control client 16), send operation instructions to the aerial system 12, store control client (16) information (e.g., associated aerial system identifiers, security keys, user account information, user account preferences, etc.), or perform any other suitable functionality. The remote device 14 can be a user device (e.g., smartphone, tablet, laptop, etc.), a networked server system, or be any other suitable remote computing system. The remote device 14 can include one or more: outputs, inputs, communication systems, sensors, power sources, processing systems (e.g., CPU, memory, etc.), or any other suitable component. Outputs can include: displays (e.g., LED display, OLED display, LCD, etc.), audio speakers, lights (e.g., LEDs), tactile outputs (e.g., a tixel system, vibratory motors, etc.), or any other suitable output. Inputs can include: touchscreens (e.g., capacitive, resistive, etc.), a mouse, a keyboard, a motion sensor, a microphone, a biometric input, a camera, or any other suitable input. Communication systems can include wireless connections, such as radios supporting: long-range systems (e.g., Wi-Fi, cellular, WLAN, WiMAX, microwave, IR, radio frequency, etc.), short-range systems (e.g., BLE, BLE long range, NFC, ZigBee, RF, audio, optical, etc.), or any other suitable communication system. Sensors can include: orientation sensors (e.g., accelerometer, gyroscope, etc.), ambient light sensors, temperature sensors, pressure sensors, optical sensors, acoustic sensors, or any other suitable sensor. In one variation, the remote device 14 can include a display (e.g., a touch-sensitive display including a touchscreen overlaying the display), a set of radios (e.g., Wi-Fi, cellular, BLE, etc.), and a set of orientation sensors. However, the remote device 14 can include any suitable set of components.

The aerial system 12 functions to fly within a physical space, capture video, stream the video in near-real time to the remote device 14, and operate based on operation instructions received from the remote device 14.

The aerial system 12 can additionally process the video (e.g., video frames) prior to streaming the video to the remote device 14 and/or audio received from an onboard audio sensor; generate and automatically operate based on its own operation instructions (e.g., to automatically follow a subject); or perform any other suitable functionality. The aerial system 12 can additionally function to move the optical sensor's field of view within the physical space. For example, the aerial system 12 can control macro movements (e.g., large FOV changes, on the order of meter adjustments), micro movements (e.g., small FOV changes, on the order of millimeter or centimeter adjustments), or any other suitable movement.

The aerial system 12 can perform certain functionality based on onboard processing of sensor data from onboard sensors. This functionality may include, but is not limited to:

Take-off and landing;
Owner recognition;
Facial recognition;
Speech recognition;
Facial expression and gesture recognition; and,
Control, e.g., motion, of the aerial system based on owner, facial, expression and gesture recognition, and speech recognition.

As shown in FIGS. 2-5, the aerial system 12 (e.g., drone) can include a body 20, a processing system 22, a communication system 24, an optical system 26, and an actuation mechanism 28 mounting the optical system 26 to the body 20. The aerial system 12 can additionally or alternatively include lift mechanisms, sensors, power system, or any other suitable component (see below).

The body 20 of the aerial system 12 functions to mechanically protect and/or retain the aerial system components. The body 20 can define a lumen, be a platform, or have any suitable configuration. The body 20 can be enclosed, open (e.g., a truss), or have any suitable construction. The body 20 can be made of metal, plastic (e.g., polymer), carbon composite, or any other suitable material. The body 20 can define a longitudinal axis, a lateral axis, a transverse axis, a front end, a back end (e.g., opposing the front end along the longitudinal axis), a top, a bottom (e.g., opposing the top along the transverse axis), or any other suitable reference. In one variation, while in flight, a transverse axis of the body 20 can be substantially parallel a gravity vector (e.g., perpendicular a ground plane) and the body's longitudinal and lateral axes can be substantially perpendicular the gravity vector (e.g., parallel the ground plane). However, the body 20 can be otherwise configured.

The processing system 22 of the aerial system 12 functions to control aerial system operation. The processing system 22 can: receive operation instructions from the communication system 24, interpret the operation instructions into machine instructions, and control aerial system components based on the machine instructions (individually or as a set). The processing system 22 can additionally or alternatively process the images recorded by the camera, stream images to the remote device 14 (e.g., in real- or near-real time), or perform any other suitable functionality. The processing system 22 can include one or more: processors 30 (e.g., CPU, GPU, etc.), memory (e.g., Flash, RAM, etc.), or any other suitable processing component. In one variation, the processing system 22 can additionally include dedicated hardware that automatically processes the images (e.g., de-warps the image, filters the image, crops the image, etc.) prior to transmission to the remote device 14. The processing system 22 is preferably connected to the active components of the aerial system 12 and mounted to the body 20, but can alternatively be otherwise related to aerial system components.

The communication system 24 of the aerial system 12 functions to send and/or receive information from the remote device 14. The communication system 24 is preferably connected to the processing system 22, such that the communication system 24 sends and/or receives data form the processing system 22, but can alternatively be connected to any other suitable component. The aerial system 12 can include one or more communication systems 24 of one or more types. The communication system 24 can include wireless connections, such as radios supporting: long-range systems (e.g., Wi-Fi, cellular, WLAN, WiMAX, microwave, IR, radio frequency, etc.), short-range systems (e.g., BLE, BLE long range, NFC, ZigBee, RF, audio, optical, etc.), or any other suitable communication system 24. The communication system 24 preferably shares at least one system protocol (e.g., BLE, RF, etc.) with the remote device 14, but can alternatively communicate with the remote device 14 via an intermediary communication system (e.g., a protocol translation system). However, the communication system 24 can be otherwise configured.

The optical system 26 of the aerial system 12 functions to record images of the physical space proximal the aerial system 12. The optical system 26 is preferably mounted to the body 20 via the actuation mechanism 28, but can alternatively be statically mounted to the body 20, removably mounted to the body 20, or otherwise mounted to the body 20. The optical system 26 is preferably mounted to the front end of the body 20, but can optionally be mounted to the bottom (e.g., proximal the front), top, back end, or any other suitable portion of the body 20. The optical system 26 is preferably connected to the processing system 30, but can alternatively be connected to the communication system 24 or to any other suitable system. The optical system 26 can additionally include dedicated image processing hardware that automatically processes images recorded by the camera prior to transmission to the processor or other endpoint. The aerial system 12 can include one or more optical systems 26 of same or different type, mounted to the same or different position. In one variation, the aerial system 12 includes a first optical system 26, mounted to the front end of the body 20, and a second optical system 26, mounted to the bottom of the body 20. The first optical system 26 can actuate about a pivotal support, and the second optical system 26 can be substantially statically retained relative to the body 20, with the respective active surface substantially parallel the body bottom. The first optical sensor 36 can be high-definition, while the second optical sensor 36 can be low definition. However, the optical system 26 can be otherwise configured.

Figure 1:
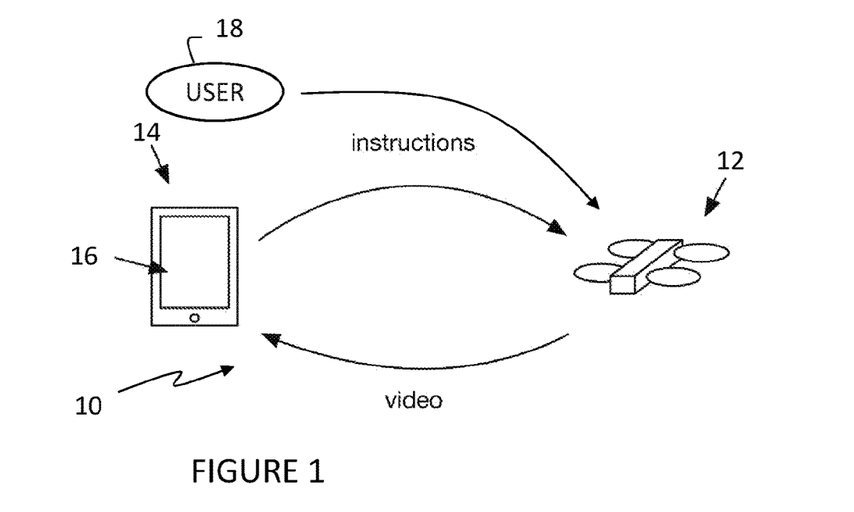
FIG. 1 is a schematic representation of an aerial system and a system for controlling the aerial system, according to an embodiment of the present invention.
Figure 2:
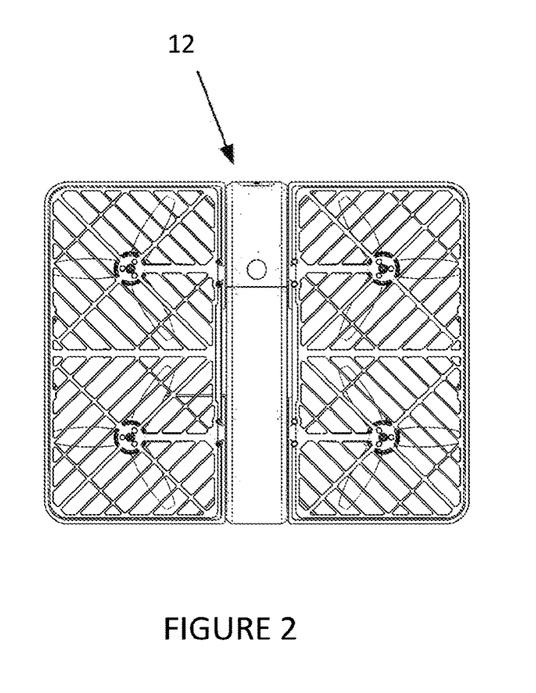
FIG. 2 is a picture of an exemplary aerial system, according to an embodiment of the present invention.
Figure 3:
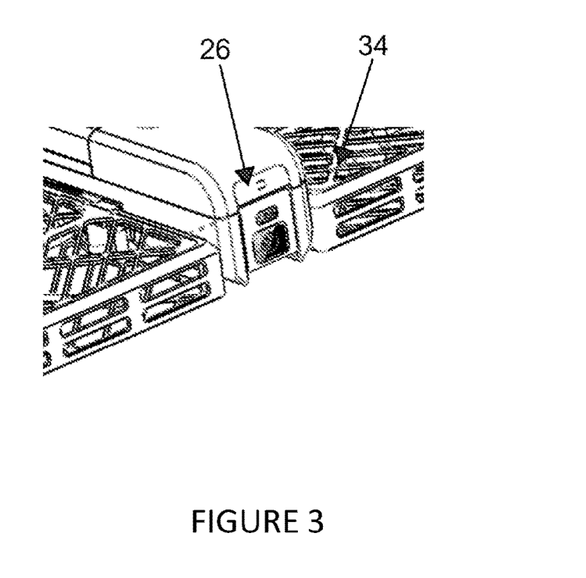
FIG. 3 is a picture of an exemplary optical system, according to an embodiment of the present invention.
Figure 4:
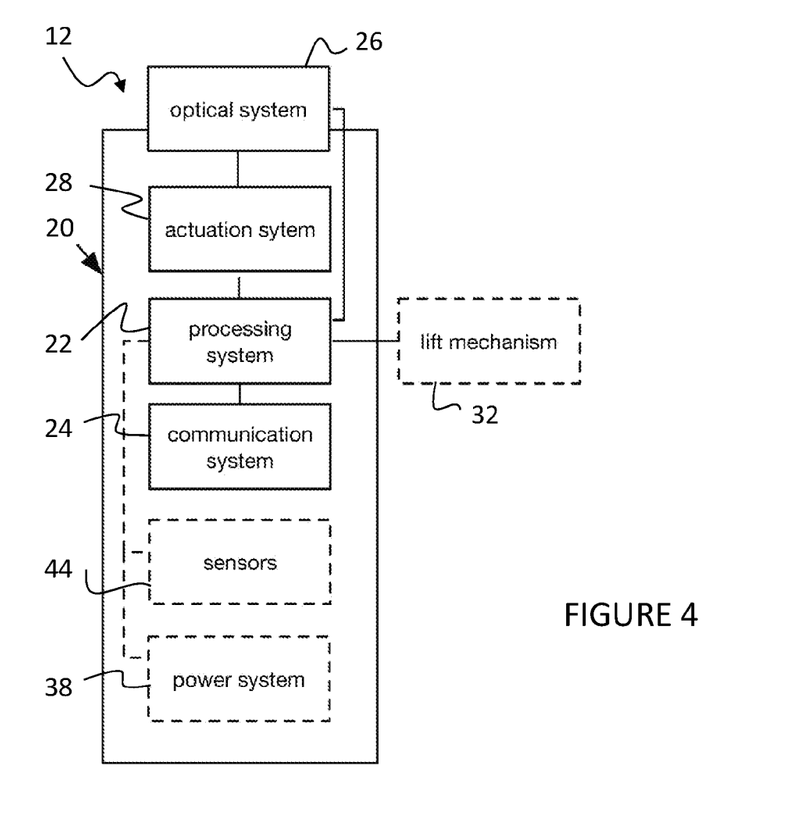
FIG. 4 is a second schematic representation of the aerial system, according to an embodiment of the present invention.
Figure 5:
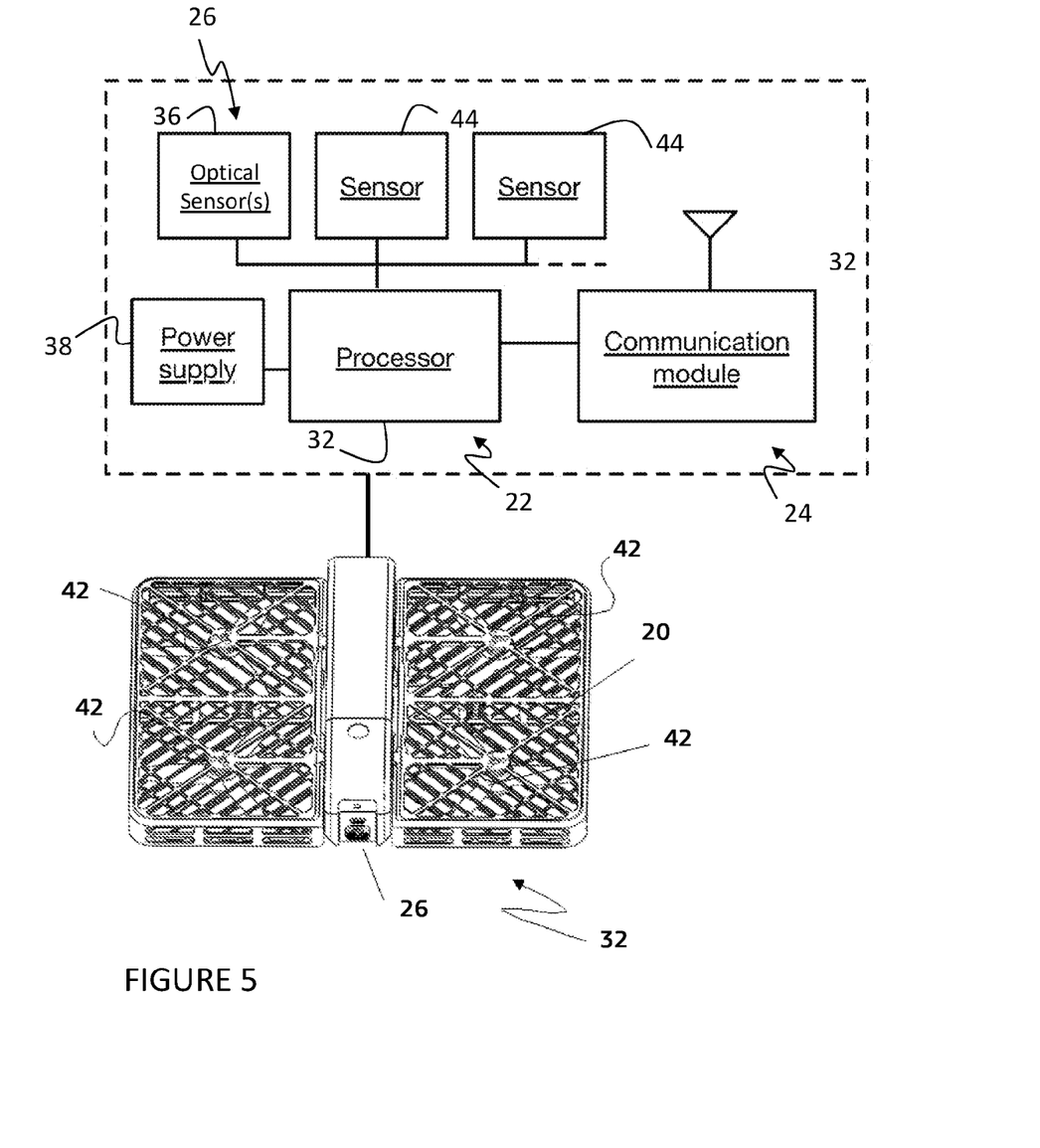
FIG. 5 is a third schematic representation of the system for controlling the aerial system and the aerial system, according to an embodiment of the present invention.

The optical system 26 can include one or more optical sensors 36 (see FIG. 5). The one or more optical sensors 36 can include: a single lens camera (e.g., CCD camera, CMOS camera, etc.), a stereo-camera, a hyperspectral camera, a multispectral camera, or any other suitable image sensor. However, the optical system 26 can be any other suitable optical system 26. The optical system 26 can define one or more active surfaces that receive light, but can alternatively include any other suitable component. For example, an active surface of a camera can be an active surface of a camera sensor (e.g., CCD sensor, CMOS sensor, etc.), preferably including a regular array of sensor pixels. The camera sensor or other active surface is preferably substantially planar and rectangular (e.g., having a first sensor edge, a second sensor edge opposing the first sensor edge, and third and fourth sensor edges each perpendicular to and extending from the first sensor edge to the second sensor edge), but can alternatively have any suitable shape and/or topography. The optical sensor 36 can produce an image frame. The image frame preferably corresponds with the shape of the active surface (e.g., rectangular, having a first and second frame edge opposing each other, etc.), more preferably defining a regular array of pixel locations, each pixel location corresponding to a sensor pixel of the active surface and/or pixels of the images sampled by the optical sensor 36, but can alternatively have any suitable shape. The image frame preferably defines aspects of the images sampled by the optical sensor 36 (e.g., image dimensions, resolution, pixel size and/or shape, etc.). The optical sensor 36 can optionally include a zoom lens, digital zoom, fisheye lens, filter, or any other suitable active or passive optical adjustment. Application of the optical adjustment can be actively controlled by the controller, manually controlled by the user 18 (e.g., wherein the user manually sets the adjustment), controlled by the remote device 14, or otherwise controlled. In one variation, the optical system 26 can include a housing enclosing the remainder of the optical system 26 components, wherein the housing is mounted to the body 20. However, the optical system 26 can be otherwise configured.

The actuation mechanism 28 of the aerial system 12 functions to actionably mount the optical system 26 to the body 20. The actuation mechanism 28 can additionally function to dampen optical sensor vibration (e.g., mechanically stabilize the resultant image), accommodate for aerial system 12 roll, or perform any other suitable functionality. The actuation mechanism 28 can be active (e.g., controlled by the processing system), passive (e.g., controlled by a set of weights, spring elements, magnetic elements, etc.), or otherwise controlled. The actuation mechanism 28 can rotate the optical system 26 about one or more axes relative to the body 20, translate the optical system 26 along one or more axes relative to the body 20, or otherwise actuate the optical system 26. The optical sensor(s) 36 can be mounted to the support along a first end, along an optical sensor back (e.g., opposing the active surface), through the optical sensor body, or along any other suitable portion of the optical sensor 36.

In one variation, the actuation mechanism 28 can include a motor (not shown) connected to a single pivoted support (e.g., gimbal), wherein the motor pivots the support about the rotational (or gimbal) axis 34 based on instructions received from the controller. The support is preferably arranged with the rotational axis substantially parallel the lateral axis of the body 20, but can alternatively be arranged with the rotational axis at any other suitable orientation relative to the body 20. The support is preferably arranged within a recessed cavity defined by the body 20, wherein the cavity further encompasses the optical sensor 36 but can alternatively be arranged along the body 20 exterior or arranged at any other suitable portion of the body 20. The optical sensor 36 is preferably mounted to the support with the active surface substantially parallel the rotational axis (e.g., with the lateral axis, or axis parallel the lateral axis of the body 20, substantially parallel the rotational axis), but can alternatively be arranged with the active surface arranged at any suitable angle to the rotational axis.

The motor is preferably an electric motor, but can alternatively be any other suitable motor. Examples of electric motors that can be used include: DC motors (e.g., brushed motors), EC motors (e.g., brushless motors), induction motor, synchronous motor, magnetic motor, or any other suitable electric motor. The motor is preferably mounted to the body 20 (e.g., the body interior), electrically connected to and controlled by the processing system 22, and electrically connected to and powered by a power source or system 38. However, the motor can be otherwise connected. The actuation mechanism 28 preferably includes a single motor-support set, but can alternatively include multiple motor-support sets, wherein auxiliary motor-support sets can be arranged orthogonal (or at any other suitable angle to) the first motor-support set.

In a second variation, the actuation mechanism 28 can include a set of pivoted supports and weights connected to the optical sensor 36 offset from the optical sensor center of gravity, wherein the actuation mechanism 28 passively stabilizes the optical sensor 36.

A lift mechanism 40 of the aerial system 12 functions to enable aerial system flight. The lift mechanism 40 preferably includes a set propeller blades 42 driven by a motor (not shown), but can alternatively include any other suitable propulsion mechanism. The lift mechanism 40 is preferably mounted to the body 20 and controlled by the processing system 22, but can alternatively be otherwise mounted to the aerial system 12 and/or controlled. The aerial system 12 can include multiple lift mechanisms 40. In one example, the aerial system 12 includes four lift mechanisms 40 (e.g., two pairs of lift mechanisms 40), wherein the lift mechanisms 40 are substantially evenly distributed about the perimeter of the aerial system 12 (e.g., wherein the lift mechanisms 40 of each pair oppose each other across the body 20). However, the lift mechanisms 40 can be otherwise configured.

Additional sensors 44 of the aerial system 12 function to record signals indicative of aerial system operation, the ambient environment surrounding the aerial system 12 (e.g., the physical space proximal the aerial system 12), or any other suitable parameter. The sensors 44 are preferably mounted to the body 20 and controlled by the processing system 22, but can alternatively be mounted to any other suitable component and/or otherwise controlled. The aerial system 12 can include one or more sensors 36, 44. Examples of sensors that can be used include: orientation sensors (e.g., accelerometer, gyroscope, etc.), ambient light sensors, temperature sensors, pressure sensors, optical sensors, acoustic sensors (e.g., microphones), voltage sensors, current sensors, or any other suitable sensor.

The power supply 38 of the aerial system 12 functions to power the active components of the aerial system 12. The power supply 38 is preferably mounted to the body 20, and electrically connected to all active components of the aerial system 12 (e.g., directly or indirectly), but can be otherwise arranged. The power supply 38 can be a primary battery, secondary battery (e.g., rechargeable battery), fuel cell, energy harvester (e.g., solar, wind, etc.), or be any other suitable power supply. Examples of secondary batteries that can be used include: a lithium chemistry (e.g., lithium ion, lithium ion polymer, etc.), nickel chemistry (e.g., NiCad, NiMH, etc.), or batteries with any other suitable chemistry.

The aerial system(s) 12, and can optionally be used with a remote computing system, or with any other suitable system. The aerial system 12 functions to fly, and can additionally function to take photographs, deliver loads, and/or relay wireless communications. The aerial system 12 is preferably a rotorcraft (e.g., quadcopter, helicopter, cyclocopter, etc.), but can alternatively be a fixed-wing aircraft, aerostat, or be any other suitable aerial system 12. The aerial system 12 can include a lift mechanism 40, a power supply 38, sensors 36, 44, a processing system 22, a communication system 24, a body 20, and/or include any other suitable component.

The lift mechanism 40 of the aerial system 12 functions to provide lift, and preferably includes a set of rotors driven (individually or collectively) by one or more motors. Each rotor is preferably configured to rotate about a corresponding rotor axis, define a corresponding rotor plane normal to its rotor axis, and sweep out a swept area on its rotor plane. The motors are preferably configured to provide sufficient power to the rotors to enable aerial system flight, and are more preferably operable in two or more modes, at least one of which includes providing sufficient power for flight and at least one of which includes providing less power than required for flight (e.g., providing zero power, providing 10% of a minimum flight power, etc.). The power provided by the motors preferably affects the angular velocities at which the rotors rotate about their rotor axes. During aerial system flight, the set of rotors are preferably configured to cooperatively or individually generate (e.g., by rotating about their rotor axes) substantially all (e.g., more than 99%, more than 95%, more than 90%, more than 75%) of the total aerodynamic force generated by the aerial system 12 (possibly excluding a drag force generated by the body 20 such as during flight at high airspeeds). Alternatively, or additionally, the aerial system 12 can include any other suitable flight components that function to generate forces for aerial system flight, such as jet engines, rocket engines, wings, solar sails, and/or any other suitable force-generating components.

In one variation, the aerial system 12 includes four rotors, each arranged at a corner of the aerial system body. The four rotors are preferably substantially evenly dispersed about the aerial system body, and each rotor plane is preferably substantially parallel (e.g., within 10 degrees) a lateral plane of the aerial system body (e.g., encompassing the longitudinal and lateral axes). The rotors preferably occupy a relatively large portion of the entire aerial system 12 (e.g., 90%, 80%, 75%, or majority of the aerial system footprint, or any other suitable proportion of the aerial system 12). For example, the sum of the square of the diameter of each rotor can be greater than a threshold amount (e.g., 10%, 50%, 75%, 90%, 110%, etc.) of the convex hull of the projection of the aerial system 12 onto a primary plane of the system (e.g., the lateral plane). However, the rotors can be otherwise arranged.

The power supply 38 of the aerial system 12 functions to power the active components of the aerial system 12 (e.g., lift mechanism's motors, etc.). The power supply 38 can be mounted to the body 20 and connected to the active components, or be otherwise arranged. The power supply 38 can be a rechargeable battery, secondary battery, primary battery, fuel cell, or be any other suitable power supply.

The sensors 36, 44 of the aerial system 12 function to acquire signals indicative of the aerial system's ambient environment and/or aerial system operation. The sensors 36, 44 are preferably mounted to the body 20, but can alternatively be mounted to any other suitable component. The sensors 36, 44 are preferably powered by the power supply 38 and controlled by the processor, but can be connected to and interact with any other suitable component. The sensors 36, 44 can include one or more: cameras (e.g., CCD, CMOS, multispectral, visual range, hyperspectral, stereoscopic, etc.), orientation sensors (e.g., inertial measurement sensors, accelerometer, gyroscope, altimeter, magnetometer, etc.), audio sensors (e.g., transducer, microphone, etc.), barometers, light sensors, temperature sensors, current sensor (e.g., Hall effect sensor), air flow meter, voltmeters, touch sensors (e.g., resistive, capacitive, etc.), proximity sensors, force sensors (e.g., strain gauge meter, load cell), vibration sensors, chemical sensors, sonar sensors, location sensor (e.g., GPS, GNSS, triangulation, etc.), or any other suitable sensor. In one variation, the aerial system 12 includes a first camera mounted (e.g., statically or rotatably) along a first end of the aerial system body with a field of view intersecting the lateral plane of the body; a second camera mounted along the bottom of the aerial system body with a field of view substantially parallel the lateral plane; and a set of orientation sensors, such as an altimeter and accelerometer. However, the system can include any suitable number of any sensor type.

The processing system 22 of the aerial system 12 functions to control aerial system operation. The processing system 22 can perform the method; stabilize the aerial system 12 during flight (e.g., selectively operate the rotors to minimize aerial system wobble in-flight); receive, interpret, and operate the aerial system 12 based on remote control instructions; or otherwise control aerial system operation. The processing system 22 is preferably configured to receive and interpret measurements sampled by the sensors 36, 44, more preferably by combining measurements sampled by disparate sensors (e.g., combining camera and accelerometer data). The aerial system 12 can include one or more processing systems, wherein different processors can perform the same functionality (e.g., function as a multi-core system), or be specialized. The processing system 22 can include one or more: processors (e.g., CPU, GPU, microprocessor, etc.), memory (e.g., Flash, RAM, etc.), or any other suitable component. The processing system 22 is preferably mounted to the body 20, but can alternatively be mounted to any other suitable component. The processing system 22 is preferably powered by the power supply 38, but can be otherwise powered. The processing system 22 is preferably connected to and controls the sensors 36, 44, communication system 24, and lift mechanism 40, but can additionally or alternatively be connected to and interact with any other suitable component.

The communication system 24 of the aerial system 12 functions to communicate with one or more remote computing systems. The communication system 24 can be a long-range communication module, a short-range communication module, or any other suitable communication module. The communication system 24 can facilitate wired and/or wireless communication. Examples of the communication system 24 include an 802.11x, Wi-Fi, Wi-Max, NFC, RFID, Bluetooth, Bluetooth Low Energy, ZigBee, cellular telecommunications (e.g., 2G, 3G, 4G, LTE, etc.), radio (RF), wired connection (e.g., USB), or any other suitable communication system 24 or combination thereof. The communication system 24 is preferably powered by the power supply 38, but can be otherwise powered. The communication system 24 is preferably connected to the processing system 22, but can additionally or alternatively be connected to and interact with any other suitable component.

The body 20 of the aerial system 12 functions to support the aerial system components. The body can additionally function to protect the aerial system components. The body 20 preferably substantially encapsulates the communication system 24, power supply 38, and processing system 22, but can be otherwise configured. The body 20 can include a platform, a housing, or have any other suitable configuration. In one variation, the body 20 includes a main body housing the communication system 24, power supply 38, and processing system 22, and a first and second frame (e.g., cage) extending parallel the rotor rotational plane and arranged along a first and second side of the main body 20. The frames can function as an intermediary component between the rotating rotors and a retention mechanism (e.g., retention mechanism such as a user's hand). The frame can extend along a single side of the body 20 (e.g., along the bottom of the rotors, along the top of the rotors), along a first and second side of the body 20 (e.g., along the top and bottom of the rotors), encapsulate the rotors (e.g., extend along all sides of the rotors), or be otherwise configured. The frames can be statically mounted or actuatably mounted to the main body 20.

The frame can include one or more apertures (e.g., airflow apertures) fluidly connecting one or more of the rotors to an ambient environment, which can function to enable the flow of air and/or other suitable fluids between the ambient environment and the rotors (e.g., enabling the rotors to generate an aerodynamic force that causes the aerial system 12 to move throughout the ambient environment). The apertures can be elongated, or can have comparable length and width. The apertures can be substantially identical, or can differ from each other. The apertures are preferably small enough to prevent components of a retention mechanism (e.g., fingers of a hand) from passing through the apertures. The geometrical transparency (e.g., ratio of open area to total area) of the frame near the rotors is preferably large enough to enable aerial system flight, more preferably enabling high-performance flight maneuvering. For example, each aperture can be smaller than a threshold size (e.g., smaller than the threshold size in all dimensions, elongated slots narrower than but significantly longer than the threshold size, etc.). In a specific example, the frame has a geometrical transparency of 80-90%, and the apertures (e.g., circles, polygons such as regular hexagons, etc.) each of define a circumscribed circle with a diameter of 12-16 mm. However, the body can be otherwise configured.

The body 20 (and/or any other suitable aerial system components) can define a retention region that can be retained by a retention mechanism (e.g., a human hand, an aerial system dock, a claw, etc.). The retention region preferably surrounds a portion of one or more of the rotors, more preferably completely surrounding all of the rotors, thereby preventing any unintentional interaction between the rotors and a retention mechanism or other object near the aerial system 12. For example, a projection of the retention region onto an aerial system plane (e.g., lateral plane, rotor plane, etc.) can overlap (e.g., partially, completely, a majority of, at least 90% of, etc.) a projection of the swept area of one or more of the rotors (e.g., swept area of a rotor, total swept area of the set of rotors, etc.) onto the same aerial system plane.

The aerial system 12 can additionally include inputs (e.g., microphones, cameras, etc.), outputs (e.g., displays, speakers, light emitting elements, etc.), or any other suitable component.

The remote computing system functions to receive auxiliary user inputs, and can additionally function to automatically generate control instructions for and send the control instructions to the aerial system(s) 12. Each aerial system 12 can be controlled by one or more remote computing systems. The remote computing system preferably controls the aerial system 12 through a client (e.g., a native application, browser application, etc.), but can otherwise control the aerial system 12. The remote computing system can be a user device, remote server system, connected appliance, or be any other suitable system. Examples of the user device include a tablet, smartphone, mobile phone, laptop, watch, wearable device (e.g., glasses), or any other suitable user device. The user device can include power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, etc.), data communication system (e.g., a Wi-Fi module, BLE, cellular module, etc.), or any other suitable component.

The system 10 may be configured for controller-free user drone interaction. Normally, the aerial system, or drone, 12 requires a separate device, e.g., the remote device 14. The remote device 14 may be embodied in different types of devices, including, but not limited to a ground station, remote control, or mobile phone, etc. . . . In some embodiments, control of the aerial system 12 may be accomplished by the user through user expression without utilization of the remote device 14. User expression may include, but is not limited to, any action performed by the user that do not include physical interaction with the remote device 14, including thought (through brain wave measurement), facial expression (including eye movement), gesture and/or voice. In such embodiments, user instructions are received directly via the optical sensors 36 and at least some of the other sensors 44 and processed by the onboard processing system 22 to control the aerial system 12.

In some embodiments, the aerial system 12 may alternatively be controlled via the remote device 14.

In at least one embodiment, the aerial system 12 may be controlled without physical interaction with the remote device 14, however, a display of the remote device 14 may be used to display images and/or video relayed from the aerial system 12 which may aid the user 18 in controlling the aerial system 12. In addition, sensors 36, 44 associated with the remote device 14, e.g., camera(s) and/or a microphone (not show) may relay data to the aerial system 12, e.g., when the aerial system 12 is too far away from the user 18. The sensor data relayed from the remote device 14 to the aerial system 12 is used in the same manner as the sensor data from the on-board sensors 36, 44 are used to control the aerial system 12 using user expression.

In this manner, the aerial system 12 may be fully controlled, from start to finish, either (1) without utilization of a remote device 14, or (2) without physical interaction with the remote device 14. Control of the aerial system 12 based on user instructions received at various on-board sensors 36, 44. It should be noted that in the following discussion, utilization of on-board sensors 36, 44 may also include utilization of corresponding or similar sensors on the remote device 14.

In general, the user 18 may utilize certain gestures and/or voice control to control take-off, landing, motion of the aerial system 12 during flight and other features, such as triggering of photo and/or video capturing. As discussed above, the aerial system 12 may provide the following features without utilization of, or processing by, a remote device 14:

Take-off and landing;
Owner recognition;
Facial recognition;
Speech recognition;
Facial expression and gesture recognition; and,
Control, e.g., motion, of the aerial system based on owner, facial, expression and gesture recognition, and speech recognition.

As detailed above, the aerial system 12 includes an optical system 26 that includes one or more optical sensor 36, such as a camera. The at least one on-board camera is configured for live video streaming and computer vision analysis. Optionally the aerial system 12 can have at least one depth sensor (or stereo-vision pair) for multi-pixel depth sensing. Optionally the aerial system 12 can have at least one microphone on board for voice recognition and control.

In general, in order to provide full control of the aerial system 12, a plurality of user/drone interactions or activities from start to end of an aerial session are provided. The user/drone interactions, include, but are not limited to take-off and landing, owner recognition gesture recognition, facial expression recognition, and voice control.

Figure 6:
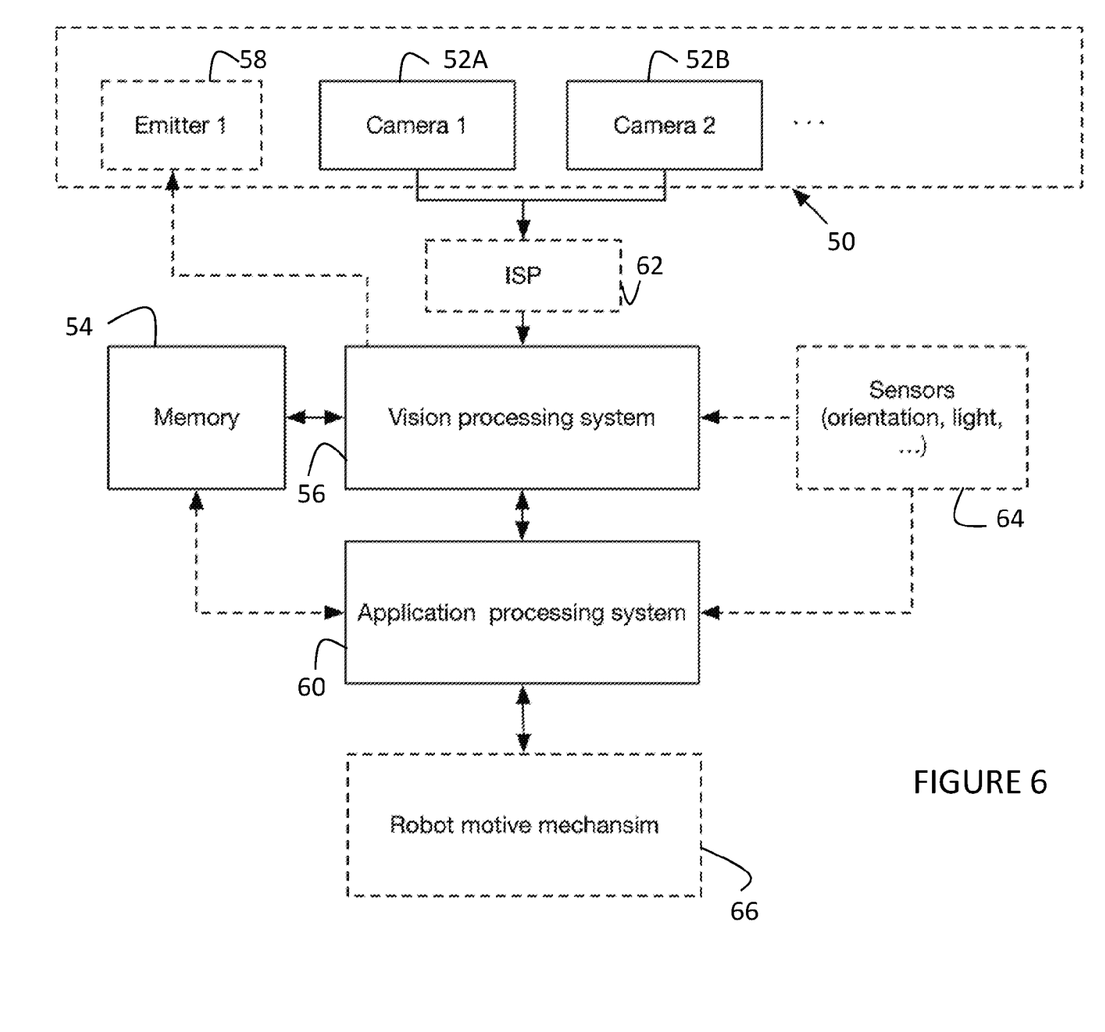
FIG. 6 is a schematic representation of an aerial system including an obstacle detection and avoidance system, according to an embodiment of the present invention.

With reference to FIG. 6, in another aspect of the present invention, the aerial system 12 may include an obstacle detection and avoidance system 50. In one embodiment, the obstacle detection and avoidance system 50 includes the pair of ultra-wide angle lens cameras 52A 52B. As will be described more fully below, the pair of cameras 52A, 52B, are equipped coaxially at the center top and center bottom of the fuselage (see below).

The method and/or system can confer several benefits over conventional systems. First, the images recorded by the camera are processed on-board, in real- or near-real time. This allows the robot to navigate using the images recorded by the cameras.

The pair of cameras 52A, 52B are generally mounted or statically fixed to housing of the body 20. A memory 54 and a vision processor 56 are connected to the pair of cameras 52A, 52B. The system functions to sample images of a monitored region for real- or near-real time image processing, such as depth analysis. The system can additionally or alternatively generate 3D video, generate a map of the monitored region, or perform any other suitable functionality.

The housing functions to retain the pair of cameras 52A, 52B in a predetermined configuration. The system preferably includes a single housing that retains the pair of cameras 52A, 52B, but can alternatively include multiple housing pieces or any other suitable number of housing pieces.

The pair of cameras 52A, 52B may function to sample signals of the ambient environment surrounding the system 12. The pair of cameras 52A, 52B are arranged with the respective view cone of each camera overlapping a view cone of the other camera (see below).

Each camera 52A, 52B can be a CCD camera, CMOS camera, or any other suitable type of camera. The camera can be sensitive in the visible light spectrum, IR spectrum, or any other suitable spectrum. The camera can be hyperspectral, multispectral, or capture any suitable subset of bands. The cameras can have a fixed focal length, adjustable focal length, or any other suitable focal length. However, the camera can have any other suitable set of parameter values. The cameras of the plurality can be identical or different.

Each camera is preferably associated with a known location relative to a reference point (e.g., on the housing, a camera of the plurality, on the host robot, etc.), but can be associated with an estimated, calculated, or unknown location. The pair of cameras 52A, 52B are preferably statically mounted to the housing (e.g., through-holes in the housing), but can alternatively be actuatably mounted to the housing (e.g., by a joint). The cameras can be mounted to the housing faces, edges, vertices, or to any other suitable housing feature. The cameras can be aligned with, centered along, or otherwise arranged relative to the housing feature. The camera can be arranged with an active surface perpendicular a housing radius or surface tangent, an active surface parallel a housing face, or be otherwise arranged. Adjacent camera active surfaces can be parallel each other, at a non-zero angle to each other, lie on the same plane, be angled relative to a reference plane, or otherwise arranged. Adjacent cameras preferably have a baseline (e.g., inter-camera or axial distance, distance between the respective lenses, etc.) of 6.35 cm, but can be further apart or closer together.

The cameras 52A, 52B may be connected to the same visual processing system and memory, but can be connected to disparate visual processing systems and/or memories. The cameras are preferably sampled on the same clock, but can be connected to different clocks (e.g., wherein the clocks can be synchronized or otherwise related). The cameras are preferably controlled by the same processing system, but can be controlled by different processing systems. The cameras are preferably powered by the same power source (e.g., rechargeable battery, solar panel array, etc.; host robot power source, separate power source, etc.), but can be powered by different power sources or otherwise powered.

The obstacle detection and avoidance system 50 may also include an emitter 58 that functions to illuminate a physical region monitored by the cameras 52A, 52B. The system 50 can include one emitter 58 for one or more of the cameras 52A, 52B, multiple emitters 58 for one or more of the cameras 52A, 52B, or any suitable number of emitters 58 in any other suitable configuration. The emitter(s) 58 can emit modulated light, structured light (e.g., having a known pattern), collimated light, diffuse light, or light having any other suitable property. The emitted light can include wavelengths in the visible range, UV range, IR range, or in any other suitable range. The emitter position (e.g., relative to a given camera) is preferably known, but can alternatively be estimated, calculated, or otherwise determined.

In a second variation, the obstacle detection and avoidance system 50 operates as a non-contact active 3D scanner. The non-contact system is a time of flight sensor, including a camera and an emitter, wherein the camera records reflections (of the signal emitted by the emitter) off obstacles in the monitored region and determines the distance between the system 50 and the obstacle based on the reflected signal. The camera and emitter are preferably mounted within a predetermined distance of each other (e.g., several mm), but can be otherwise mounted. The emitted light can be diffuse, structured, modulated, or have any other suitable parameter. In a second variation, the non-contact system is a triangulation system, also including a camera and emitter. The emitter is preferably mounted beyond a threshold distance of the camera (e.g., beyond several mm of the camera) and directed at a non-parallel angle to the camera active surface (e.g., mounted to a vertex of the housing), but can be otherwise mounted. The emitted light can be collimated, modulated, or have any other suitable parameter. However, the system 50 can define any other suitable non-contact active system. However, the pair of cameras can form any other suitable optical range finding system.

The memory 54 of the system 50 functions to store camera measurements. The memory can additionally function to store settings; maps (e.g., calibration maps, pixel maps); camera positions or indices; emitter positions or indices; or any other suitable set of information. The system 50 can include one or more pieces of memory. The memory is preferably nonvolatile (e.g., flash, SSD, eMMC, etc.), but can alternatively be volatile (e.g. RAM). In one variation, the cameras 52A, 52B write to the same buffer, wherein each camera is assigned a different portion of the buffer. In a second variation, the cameras 52A, 52B write to different buffers in the same or different memory. However, the cameras 52A, 52B can write to any other suitable memory. The memory 54 is preferably accessible by all processing systems of the system (e.g., vision processor, application processor), but can alternatively be accessible by a subset of the processing systems (e.g., a single vision processor, etc.).

The vision processing system 56 of the system 50 functions to determine the distance of a physical point from the system. The vision processing system 56 preferably determines the pixel depth of each pixel from a subset of pixels, but can additionally or alternatively determine the object depth or determine any other suitable parameter of a physical point or collection thereof (e.g., object). The vision processing system 56 preferably processes the sensor stream from the cameras 52A, 52B The vision processing system 56 may process each sensor stream at a predetermined frequency (e.g., 30 FPS), but can process the sensor streams at a variable frequency or at any other suitable frequency. The predetermined frequency can be received from an application processing system 60, retrieved from storage, automatically determined based on a camera score or classification (e.g., front, side, back, etc.), determined based on the available computing resources (e.g., cores available, battery level remaining, etc.), or otherwise determined. In one variation, the vision processing system 56 processes multiple sensor streams at the same frequency. In a second variation, the vision processing system 56 processes multiple sensor streams at different frequencies, wherein the frequencies are determined based on the classification assigned to each sensor stream (and/or source camera), wherein the classification is assigned based on the source camera orientation relative to the host robot's travel vector.

The application processing system 60 of the system 50 functions to determine the time multiplexing parameters for the sensor streams. The application processing system 60 can additionally or alternatively perform object detection, classification, tracking (e.g., optical flow), or any other suitable process using the sensor streams. The application processing system 60 can additionally or alternatively generate control instructions based on the sensor streams (e.g., based on the vision processor output). For example, navigation (e.g., using SLAM, RRT, etc.) or visual odometry processes can be performed using the sensor streams, wherein the system and/or host robot is controlled based on the navigation outputs.

The application processing system 60 can additionally or alternatively receive control commands and operate the system 12 and/or host robot based on the commands. The application processing system 60 can additionally or alternatively receive external sensor information and selectively operate the system and/or host robot based on the commands. The application processing system 60 can additionally or alternatively determine robotic system kinematics (e.g., position, direction, velocity, and acceleration) based on sensor measurements (e.g., using sensor fusion). In one example, the application processing system 60 can use measurements from an accelerometer and gyroscope to determine the traversal vector of the system and/or host robot (e.g., system direction of travel). The application processing system 60 can optionally automatically generate control instructions based on the robotic system kinematics. For example, the application processing system 60 can determine the location of the system (in a physical volume) based on images from the cameras 52A, 52B, wherein the relative position (from the orientation sensors) and actual position and speed (determined from the images) can be fed into the flight control module. In this example, images from a downward-facing camera subset can be used to determine system translation (e.g., using optical flow), wherein the system translation can be further fed into the flight control module. In a specific example, the flight control module can synthesize these signals to maintain the robot position (e.g., hover a drone).

The application processing system 60 can include one or more application processors. The application processor can be a CPU, GPU, microprocessor, or any other suitable processing system. The application processing system 60 can implemented as part of, or separate from, the vision processing system 56, or be different from the vision processing system 56. The application processing system 60 may be connected to the visual processing system 56 by one or more interface bridges. The interface bridge can be a high-throughput and/or bandwidth connection, and can use a MIPI protocol (e.g., 2-input to 1-output camera aggregator bridges—expands number of cameras that can be connected to a vision processor), a LVDS protocol, a DisplayPort protocol, an HDMI protocol, or any other suitable protocol. Alternatively, or additionally, the interface bridge can be a low-throughput and/or bandwidth connection, and can use a SPI protocol, UART protocol, I2C protocol, SDIO protocol, or any other suitable protocol.

The system can optionally include an image signal processing unit (ISP) 62 that functions to pre-process the camera signals (e.g., images) before passing to vision processing system and/or application processing system. The ISP 62 can process the signals from all cameras, the signals from the camera subset, or signals any other suitable source. The ISP 62 can auto-white balance, correct field shading, rectify lens distortion (e.g., dewarp), crop, select a pixel subset, apply a Bayer transformation, demosaic, apply noise reduction, sharpen the image, or otherwise process the camera signals. For example, the ISP 62 can select the pixels associated with an overlapping physical region between two cameras from images of the respective streams (e.g., crop each image to only include pixels associated with the overlapping region shared between the cameras of a stereo-camera pair). The ISP 62 can be a system on a chip with multi-core processor architecture, be an ASIC, have ARM architecture, be part of the vision processing system, be part of the application processing system, or be any other suitable processing system.

The system can optionally include sensors 64 that function to sample signals indicative of system operation. The sensor output can be used to determine system kinematics, process the images (e.g., used in image stabilization), or otherwise used. The sensors 64 can be peripheral devices of the vision processing system 56, the application processing system 60, or of any other suitable processing system. The sensors 64 are preferably statically mounted to the housing but can alternatively be mounted to the host robot or to any other suitable system. Sensors 64 can include: orientation sensors (e.g., IMU, gyroscope, accelerometer, altimeter, magnetometer), acoustic sensors (e.g., microphones, transducers), optical sensors (e.g., cameras, ambient light sensors), touch sensors (e.g., force sensors, capacitive touch sensor, resistive touch sensor), location sensors (e.g., GPS system, beacon system, trilateration system), or any other suitable set of sensors.

The system can optionally include inputs (e.g., a keyboard, touchscreen, microphone, etc.), outputs (e.g., speakers, lights, screen, vibration mechanism, etc.), communication system (e.g., a WiFi module, BLE, cellular module, etc.), power storage (e.g., a battery), or any other suitable component.

The system is preferably used with a host robot that functions to traverse within a physical space. The host robot can additionally or alternatively receive remote control instructions and operate according to the remote control instructions. The host robot can additionally generate remote content or perform any other suitable functionality. The host robot can include one or more: communication modules, motive mechanisms, sensors, content-generation mechanisms, processing systems, reset mechanisms, or any other suitable set of components. The host robot can be a drone, vehicle, robot, security camera, or be any other suitable remote-controllable system. The motive mechanism can include a drivetrain, rotors, jets, treads, rotary joint, or any other suitable motive mechanism. The application processing system is preferably the host robot processing system, but can alternatively be connected to the host robot processing system or be otherwise related. In a specific example, the host robot includes an aerial system (e.g., drone) with a WiFi module, a camera, and the application processing system. The system can be mounted to the top of the host robot (e.g., as determined based on a gravity vector during typical operation), the bottom of the host robot, the front of the host robot, centered within the host robot, or otherwise mounted to the host robot. The system can be integrally formed with the host robot, removably coupled to the host robot, or otherwise attached to the host robot. One or more systems can be used with one or more host robots.

In another aspect of the present invention, a (sub) system and method 70 may be utilized to provide autonomous photography and/or videography to the aerial system 12. The autonomous photography and/or videography system 70 may be implemented, at least in part, by the processing system 22, the optical system 26, the actuation system 28 and the lift mechanism 32.

As will be discussed in more detail below, the autonomous photography and/or videography system 70 is configured to establish a desired flight trajectory, to detect a target, and to control the flight of the aerial system 12 as a function of the desired flight trajectory relative to the target using the lift mechanism. The autonomous photography and/or videography system 70 is further configured to control the camera to capture pictures and/or video.

Further, the autonomous photography and/or videography system 70 may be operable to (1) automatically modify the camera angle and flight trajectory with the target in the picture without any interaction between the user and any device; (2) automatically take photos or record videos without any interaction between the user and any device; and (3) automatically select good candidates of photos and/or video clips from raw photo/video material for further user editing or automatic editing procedures.

Figure 7:
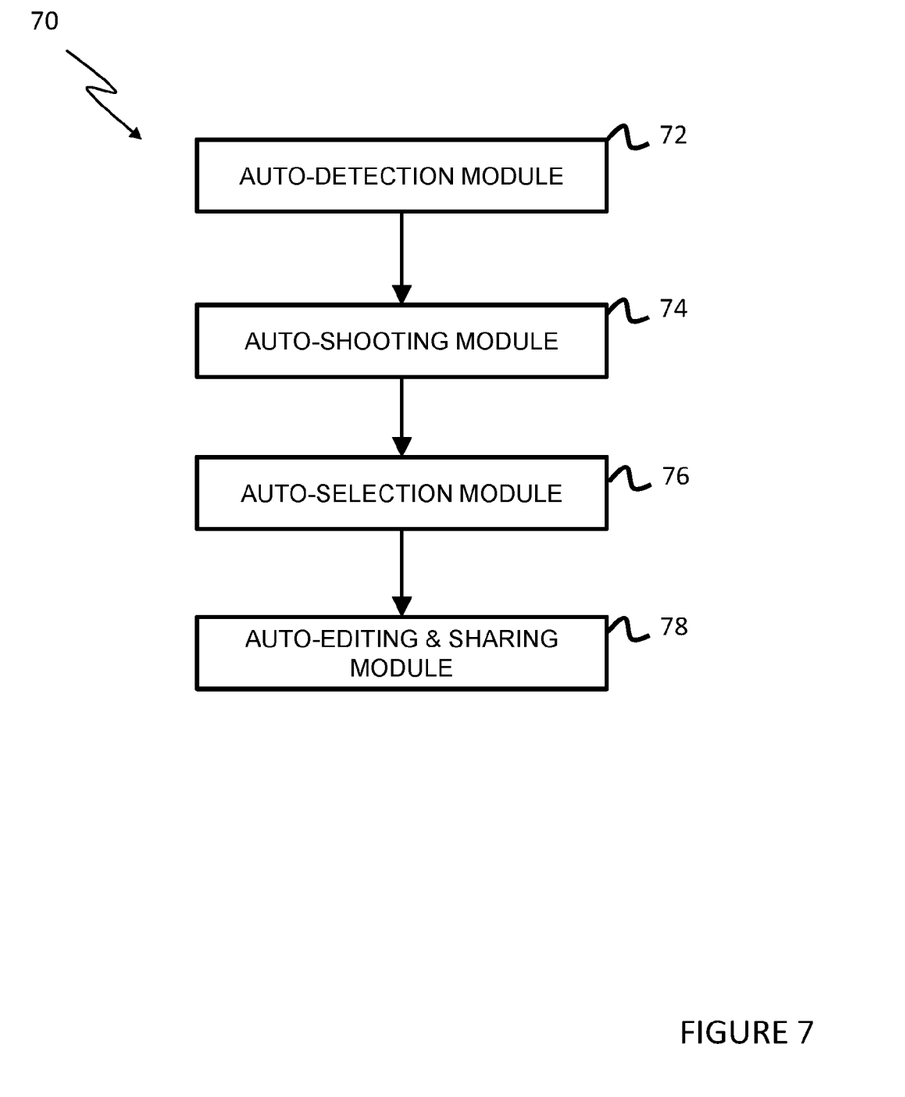
FIG. 7 is a block diagram of an autonomous photography and/or videography system, according to an embodiment of the present invention.

With reference to FIG. 7, in one embodiment the autonomous photography and/or videography system 70 includes an auto-detection and tracking module 72, an auto-shooting module 74, an auto-selection module 76 and an auto-editing and sharing module 76. As stated above, the modules 72, 74, 76, 78 may be implemented in part by a combination of software implemented vision algorithms and hardware, e.g., the processing system 22. From a user perspective, the modules 72, 74, 76, 78 may provide a fully autonomous experience. Alternatively, one or more of the modules 72, 74, 76, 78 may be used to provide a (less than fully autonomous) mode that allows the user to more easily take pictures or videos with the aerial system 12.

After the aerial system 12 has launched, the auto-detection and tracking module 72 initiates a target detection process. The target detection process will detect a target, such as a person or other item or object (see above).

After the target has been detected/located, the auto-detection and tracking module 72 modifies the angle of one of the optical sensors or cameras 36 of the optical system 26 using the actuation system 28 and modifies the flight trajectory of the aerial system 12 based on a selected flight trajectory.

The optical sensor(s) 36 acts as a vision sensor for the auto-detection and tracking module 72. The auto-detection and tracking module 72 may utilize a target detection and tracking algorithm to detect and locate the target from the video feed of the optical system 26 and a self-positioning fusion algorithm to integrate positioning data from various sensors 44. By combining the information from the self-positioning sensor fusion algorithm and the target detection and tracking algorithm, the relative position and velocity of the target to the aerial system 12 can be obtained.

In one embodiment, the target detection and tracking algorithm may include one or more of the following techniques:

(a) Tracker based techniques: TLD-tracker, KCF-tracker, Struck-tracker, CNN-based-tracker, etc.

(b) Detector based techniques: face detection algorithms, like Haar+Adaboost, face recognition algorithms, like EigenFace, human body detection algorithms, like HOG+SVM or DPM, CNN-based-object-detection methods, etc.

Additional sensor(s) may be attached to the target for even more reliable performance. For example, a GPS sensor and an inertial measurement unit (IMU) may be included in the tracker device attaching to the target. Then the information of the sensors may be transmitted via a wireless method such as Wi-Fi, or Bluetooth to the main aerial system 12. The synchronized sensor info can be used as additional supplementary observation data for better assisting the vision based target detection and tracking algorithms. The data can be used either in a filter based manner such as dumping the data into a EKF system, or in a supplementary manner such as using it as prior information for providing better tracking accuracy of the vision based tracker.

In one embodiment, the self-positioning fusion algorithm may include an extended Kalman Filter (EKF) doing sensor filtering and fusion of accelerometer, gyroscope, magnetometer, barometer, optical flow sensor, GPS, proximity sensor, sonar/radar, TOF based range finder, etc;

The same or additional vision sensor(s) providing visual odometry capability. The vision sensor is preferably having a known and fixed relative pose to the body of the aerial system. A movable vision sensor may also be provided (as long as its relative pose to the body can be accurately monitored and updated promptly). Extra inertial sensor measurements are preferred but not required. If without synchronous readings from inertial measurement unit (IMU), techniques such as visual SLAM, and SVO may be applied. If we do use the additional IMU info, then VIO and VIN can be applied.

Once the (1) the aerial system self-positioning information by using self-positioning sensor fusion techniques, (2) gimbal angle(s), and (3) 2D target position from the vision sensor, have been established, an online estimation of absolute position and velocity of the target, as well as the position and velocity of the target relative to the aerial system, may be derived.

Then the system may apply proper control strategies to fly in a designed trajectory while aiming the target in the meantime. Several different control strategies may be applied:

(a) The aerial system 12 may simply follow the target from behind, keeping a fixed distance (indefinitely or for a finite amount of time);

(b) The aerial system 12 may lead the target at the front while aiming the target, keeping a fixed distance (indefinitely or for a finite amount of time);

(c) The aerial system 12 may orbit around the target at a fixed distance with a constant/varying speed (indefinitely or for a finite amount of time);

(d) The aerial system 12 may move closer to or further away from certain camera aiming angle, with a constant/varying speed, for a finite amount of time;

(e) The aerial system 12 may move in a certain direction (in world coordinates or in target coordinate) while the optical system 26 is aimed the target, with a constant/varying speed, for a finite amount of time;

(f) The aerial system 12 may fix some degrees of freedom and only use some of its DOFs to track and aim the target, for example, it may stay at a certain 3D position in the air, and only track and aim the target by controlling its own yaw angle and the axes of its camera gimbal;

(g) A piece of trajectory and/or a series of control commands may be performed by professional photographers and recorded as a candidate of pre-defined trajectory. Data such as camera angle, relative distance and velocity of the target to the aerial system, location of target in the scene, absolute position and velocity of the aerial system, etc. at each time stamp can be saved, then an online trajectory planning algorithm can be applied to generate control commands to replicate the same trajectory;

(h) A combination of any above control strategies (or other control strategies under same principle) in sequence, either in a pre-defined order, or in a pseudo random order.

In one embodiment, one or more of these strategies may be presented to the user and selected as a desired flight trajectory.

After the target has been identified, the auto-shooting module 74 will control the optical system 26 to automatically begin obtaining pictures and/or video, i.e., "auto-shooting". While auto-shooting, the aerial system 12 or drone will fly on a designed flight trajectory with the camera angle automatically changing to maintain the target within the pictures and/or video. Auto-shooting may be based on several mechanisms: auto light condition optimization, face movement analysis, expression analysis, behavior analysis, pose analysis, condition analysis, composition analysis, and object analysis. From video-taking perspective, the aerial system 12 or drone may also automatically move in a wide range, both low and high, close and distant, lift and right, front and back and side, to make the video more vivid. The designated flight trajectory may be dynamically determined based on predetermined parameters and/or changing conditions based on sensor input. In other words, the drone or aerial system 12 could traverse a trajectory to simulate or emulate operation of the camera in a manner similar to a professional photographer or videographer. Alternatively, the user can select one or more trajectories from a set of pre-designed routes or pre-defined routes.

Further, in another aspect of the present invention, the auto-shooting module 74 has one or more modes. For example, in one embodiment, the auto-shooting module 74 may have one the following modes:

Mode 1: Taking a series of snapshots;
Mode 2: Taking a continuous video; or,
Mode 3: Taking a continuous video, at the same time taking a series of snapshots.

The mode may be selected by the user and/or be associated with a selected flight trajectory (see below).

The auto-selection module 76 selects pictures and/or video (segments) from among the obtained (or captured) pictures and/video based on a set of predetermined parameters. The selected pictures and/or video may be retained ad/or stored or alternatively, marked as being "selected". The set of predetermined parameters may include, but is not limited to: blurriness, exposure, and/or composition. For example, a blurriness detector may utilize a either a Laplacian of Gaussian filter or a variance of Laplacian filter or other suitable filter.

One example of vibration detector may utilize an inertial measurement unit or IMU (accelerometer, gyroscope, etc.) data, for a given section of data, pick a moving window time interval, calculate the variance/standard deviation within this moving window, and compare it to a pre-defined threshold.

A lower frequency vibration filter, i.e. video stability filter, can be realized by checking the 2D trajectory of the main target in the view, or by checking the sensor detected camera angle traces. A stable video can better keep the target in the view and/or keep a more stable camera angle.

For pictures, pictures are selected and/or not-selected based on the predetermined parameters. For videos, video segments may be selected and/or not selected based on the predetermined parameters. Alternatively, the auto-selection module 76 may select sub-segments from a given video segment based on the predetermined parameters and crop (and save) the sub-segment(s) as a function of the predetermined parameters.

In one aspect of the present invention, the auto-selection module 76 may be implemented. This module can work on a drone or on a smart phone. It is capable of automatically selecting photos or a truncated video clip (for example, 3-second/6-second/10-second video snippet), from a longer raw video material. Here are some rules for judging a piece of footage/video snippet: blurriness, video-stability, exposure, composition, etc. Technical points are as follows:

Over/under exposure detector: Calculate the exposure value at regions of interest, and check whether the values are below the lower threshold—underexposure/above the higher threshold—overexposure.

Composition: For each photo and video clip candidate, a target object detection or retrieve the recorded target object detection result may be performed. The results may then be analyzed to determine if the photo composition is "good" or "acceptable", in other words, whether the target is at a good location in the photo/video frame. A straight forward rule can be that if the center of the bounding box of the detected target is not within certain preferred area of the view, then it is considered as a bad candidate. More sophisticated methods leveraging deep learning may also be applied to check whether it is a good photo composition, such as: a number of Good or Acceptable photos and a number of Bad or Unacceptable photos are collected and analyzed. The collected photos are used to train a neural network to learn the rules. Finally the trained network can be deployed on the device (drone or phone) to help selecting Good or Acceptable photos.

The auto-editing and sharing module 78 modifies, i.e., edits, the selected pictures and/or selected video (segments or sub-segments) based on a set of predetermined editing parameters. The parameters may be modified by the user, e.g., using templates. In another aspect of the present invention, the auto-editing and sharing module shares the select and/or edited pictures and/or video segments with other users, devices, social networking or media sharing services. In still another aspect of the present invention, the auto-editing and sharing module 78 allows users to manually edit pictures and/or video.

Figure 8:
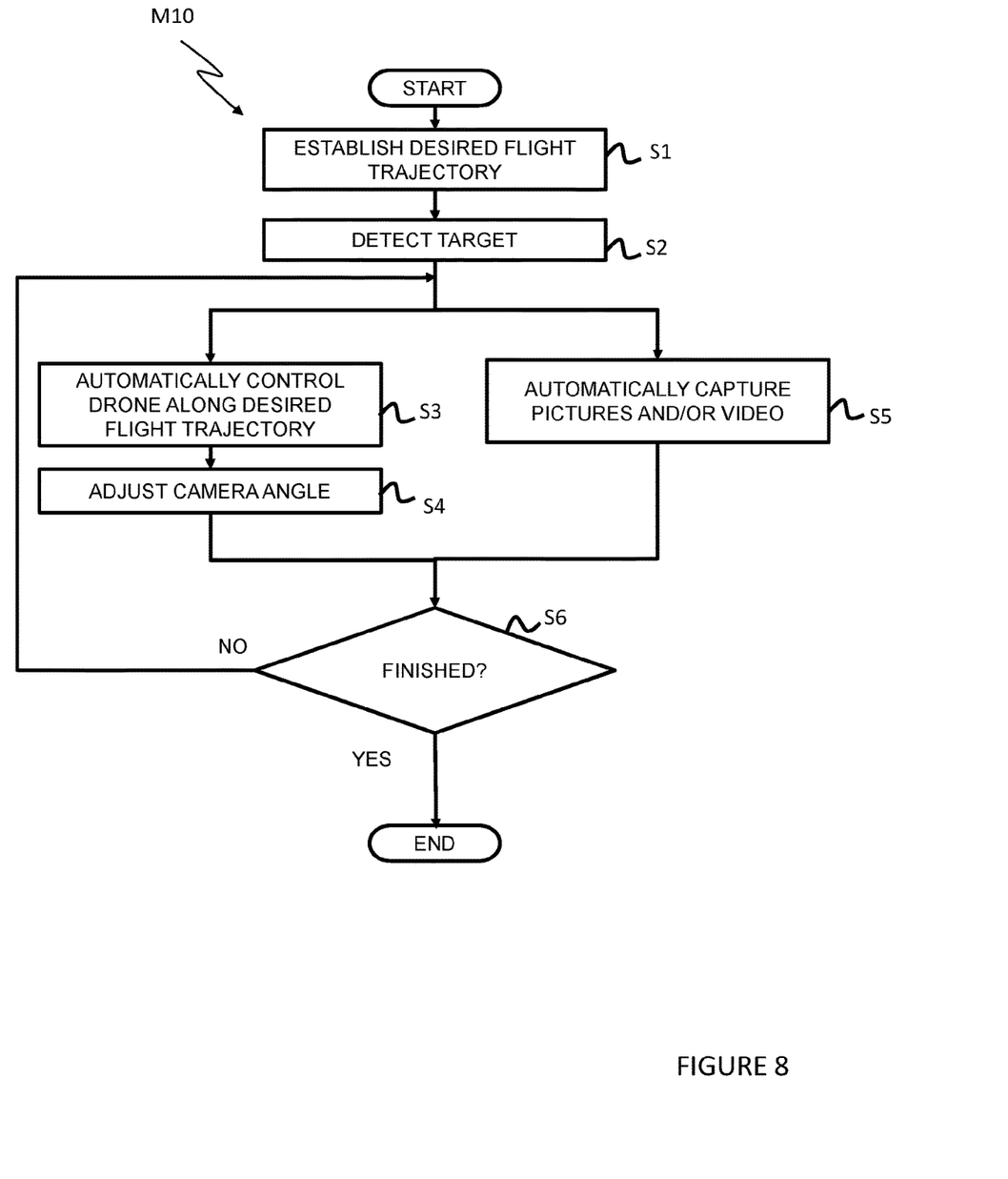
FIG. 8 is a flow diagram of a method associated with the autonomous photography and/or videography system of FIG. 7.

With reference to FIG. 8, a method M10 for operating the aerial system 12, according to an embodiment of the present invention is shown. In a first step S1, a desired flight trajectory is established. In general, the flight trajectory may be selected by the user from a set of predefined flight trajectories (see above). In a second step S2, a target is detected. The flight of the drone, relative to the target, is controlled (step S3) and a camera angle of the optical system 26 (step S4) is adjusted according to the desired flight trajectory, for example, to keep the target in frame, in a desired position in the frame and/or along a path within the frame.

In a fifth step S5, pictures and/or video are automatically captured as the drone is controlled over the desired flight trajectory.

In a sixth step S6, of the flight trajectory has been completed, then the method M10 ends. Otherwise, control returns to the third and fifth steps.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

What is claimed is:
1. An aerial system, comprising:
a body;
a lift mechanism coupled to the body;
an optical system controllably mounted to the body by an actuation system; and
a processing system coupled to the lift mechanism, the optical system, and the actuation system, the processing system includes a processor configured to:
establish a first control strategy selected from a set of predefined control strategies;
establish a desired flight trajectory as a function of the first control strategy, the desired flight trajectory being established relative a current position of a target;
establish the current position and a current velocity of the target relative to the aerial system;
control the flight of the aerial system to maintain the aerial system at a distance from the target as a function of the desired flight trajectory and the established current position and current velocity of the target using the lift mechanism; and control the optical system to capture pictures and/or video, wherein a quality of the pictures and/or video is determined by whether the target is within a preferred position within a frame of the pictures and/or video, an exposure value of the target in the pictures and/or video, and blurriness and image-stability of the target in the pictures and/or video.

2. An aerial system, as set forth in claim 1, wherein the set of predefined control strategies includes:
(a) following the target from behind at a fixed distance, indefinitely or for a finite amount of time;
(b) leading the target at the front while aiming at the target, keeping a fixed distance, indefinitely or for a finite amount of time;
(c) orbiting around the target at a fixed distance with a constant or varying speed, indefinitely or for a finite amount of time;
(d) moving closer to or further away from the target at a specified camera aiming angle, with a constant/varying speed, for a finite amount of time;
(e) moving in a certain direction, in world coordinates or in target coordinates, while the optical system is aimed the target, with a constant/varying speed, for a finite amount of time;
(f) holding one or more degrees of freedom associated with the aerial system constant and controlling other degrees of freedom to track the target; and,
(g) following a pre-recorded trajectory relative to the target.

3. An aerial system, as set forth in claim 1, wherein the set of predefined control strategies are presented to a user, wherein the first control strategy is selected by the user.

4. An aerial system, as set forth in claim 1, wherein the first control strategy is selected from the set of predefined control strategies by the processor.

5. An aerial system, as set forth in claim 1, wherein a second control strategy is established and the desired flight trajectory is established as a function of the first control strategy and the second control strategy.

6. An aerial system, as set forth in claim 5, wherein the set of predefined control strategies are presented to a user, wherein the first control strategy and the second control strategy are selected by the user.

7. An aerial system, as set forth in claim 5, wherein the first control strategy and the second control strategy are selected from the set of predefined control strategies by the processor.

8. An aerial system, as set forth in claim 1, wherein the first control strategy and the second control strategy are selected from the set of predefined control strategies by the processor.

9. An aerial system, as set forth in claim 1, including an auto-shooting module configured to establish a current shooting mode from a set of predefined shooting modes, wherein the processing system is configured to control the optical system as a function of the established current shooting mode.

10. An aerial system, as set forth in claim 9, wherein each control strategy in the set of predefined control strategies has at least one shooting modes from the set of predefined shooting modes.

11. An aerial system, as set forth in claim 9, wherein set of predefined shooting modes are presented to a user and the established shooting mode is selected by the user.

12. An aerial system, as set forth in claim 1, the system further including one or more position sensors, wherein the processing system is configured to integrate positioning data from the position sensors to establish a position of the aerial system, the processing system further including an auto-detection and tracking module, the auto-detection and tracking module being configured to:
detect and locate the target from a video feed received from the optical system; and,
responsively establish the position and the velocity of the target relative to the aerial system.

13. An aerial system, as set forth in claim 1, wherein the processing system includes an auto-selection module, the auto-selection module being configured to automatically select picture(s) and/or video and/or truncated video clip(s) based on predetermined criteria.

14. An aerial system, as set forth in claim 13, wherein the predetermined criteria includes over/under exposure and/or composition.

15. An aerial system, as set forth in claim 14, wherein the processing system includes an auto-editing module, the auto-editing module being configured to edit the selected picture(s), video, and/or video clip(s) based on predetermined editing parameters.

16. A method for operating an aerial system, the aerial system including a body, a lift mechanism, an optical system, and a body by an actuation system, method including the steps of:
establishing a first control strategy selected from a set of predefined control strategies;
establishing a desired flight trajectory as a function of the first control strategy, the desired flight trajectory being established relative a current position of a target;
establishing the current position and a current velocity of the target relative to the aerial system;
controlling the flight of the aerial system to maintain the aerial system at a distance from the target as a function of the desired flight trajectory and the established current position and current velocity of the target using the lift mechanism; and
controlling the optical system through the actuation system to capture pictures and/or video, wherein a quality of the pictures and/or video is determined by whether the target is within a preferred position within a frame of the pictures and/or video, an exposure value of the target in the pictures and/or video, and blurriness and image-stability of the target in the pictures and/or video.

17. A method, as set forth in claim 16, wherein the set of predefined control strategies includes:
following the target from behind at a fixed distance, indefinitely or for a finite amount of time;
leading the target at the front while aiming at the target, keeping a fixed distance, indefinitely or for a finite amount of time;
orbiting around the target at a fixed distance with a constant or varying speed, indefinitely or for a finite amount of time;
moving closer to or further away from the target at a specified camera aiming angle, with a constant/varying speed, for a finite amount of time;
moving in a certain direction, in world coordinates or in target coordinates, while the optical system is aimed the target, with a constant/varying speed, for a finite amount of time;
holding one or more degrees of freedom associated with the aerial system constant and controlling other degrees of freedom to track the target; and, following a pre-recorded trajectory relative to the target.

18. A method, as set forth in claim 16, wherein the set of predefined control strategies are presented to a user, wherein the first control strategy is selected by the user.

19. A method, as set forth in claim 16, wherein the first control strategy is selected from the set of predefined control strategies by the processor.

20. A method, as set forth in claim 16, wherein a second control strategy is established and the desired flight trajectory is established as a function of the first control strategy and the second control strategy.

21. A method, as set forth in claim 20, wherein the set of predefined control strategies are presented to a user, wherein the first control strategy and the second control strategy are selected by the user.

22. A method, as set forth in claim 20, wherein the first control strategy and the second control strategy are selected from the set of predefined control strategies by the processor.

23. A method, as set forth in claim 16, wherein the first control strategy and the second control strategy are selected from the set of predefined control strategies by the processor.

24. A method, as set forth in claim 16, including the step of establishing a current shooting mode from a set of predefined shooting modes, wherein the processing system is configured to control the optical system as a function of the established current shooting mode.

25. A method, as set forth in claim 24, wherein each control strategy in the set of predefined control strategies has at least one shooting modes from the set of predefined shooting modes.

26. A method, as set forth in claim 24, wherein set of predefined shooting modes are presented to a user and the established shooting mode is selected by the user.

27. A method, as set forth in claim 16, including the steps of:

integrating positioning data from position sensors to establish a position of the aerial system;

detecting and locating the target from a video feed received from the optical system; and, responsively establishing the position and the velocity of the target relative to the aerial system.

28. A method, as set forth in claim 16, including the step of automatically select picture(s) and/or video and/or truncated video clip(s) based on predetermined criteria.

29. A method, as set forth in claim 28, wherein the predetermined criteria includes over/under exposure and/or composition.

30. A method, as set forth in claim 29, including the step of automatically editing the selected picture(s), video, and/or video clip(s) based on predetermined editing parameters.

* * * * *